Patented May 10, 1927.

1,628,149

UNITED STATES PATENT OFFICE.

NOAK VICTOR HYBINETTE, OF OTTAWA, ONTARIO, CANADA.

MANUFACTURE OF MALLEABLE NICKEL.

No Drawing. Application filed January 17, 1921. Serial No. 437,996.

This invention relates to improvements in the manufacture of malleable nickel.

All malleable nickel heretofore made, so far as I am aware, has been made by furnace methods, and has always contained some small amounts at least of carbon, silicon and other impurities, which have made the metal less soft and less ductile than it would otherwise be.

The present invention relates to the production of malleable nickel from an electrolytic bath. It has been proposed to produce malleable nickel electrolytically, but nickel has never been produced commercially according to such proposals, so far as I am aware, because of the difficulty or impossibility of maintaining an electrolyte in proper condition for the plating of malleable nickel.

In order to obtain a satisfactory malleable nickel plating, the electrolyte must be neutral and no hydrogen produced at the cathode. I have found that a satisfactory deposit of malleable nickel can be obtained, and that the electrolyte can be maintained in appropriate condition for obtaining such deposit, by the use of a nickel anode of proper composition, and by treatment of the electrolyte in the manner described below.

The anode employed should contain carbon, silicon or sulfur in small amounts. An anode containing sulfur alone can be used, or an anode containing only carbon and silicon, but the presence of some of these elements appears to be necessary to make the anode sufficiently soluble. The amounts of these elements should in general be at least one per cent of each, and the best results appear to be obtained when the anode contains about one to two per cent of each or about three per cent of the three elements combined.

The electrolyte employed is a neutral solution of nickel sulphate or nickel chloride or both in varying proportions. I prefer and recommend a solution containing a chloride for the reason that the anode efficiency is greater in a solution of chlorides and it allows of higher current density. The addition of weak acids, etc., such as have been suggested, is not necessary. I prefer, however, to use a small amount of boric acid, say, ten to twenty grams per liter. The electrolyte can vary in concentration, for example, between 40 and 60 grams of nickel per liter, or an even higher concentration or proportion, if the nickel is present as nickel chloride, in part or in whole.

The current density can vary as much as between 5 and 200 amperes per sq. ft., but I prefer to use from 50 to 100 amperes, which can be used if a certain amount of chloride of nickel is present. With straight nickel sulphate electrolytes, the amperage should not go above about 20 amperes. The temperature of the electrolytes should be about 40 to 50° C.

By observing the above conditions and precautions, a satisfactory plating of malleable nickel will be obtained for a certain period of time, usually only a few hours, for the reason that the electrolyte will, after a certain time, turn either basic or acid, depending upon whether the anode efficiency is smaller or greater than the cathode efficiency. The tendency for the most part is for the solution to become acid, which causes an evolution of hydrogen, making the deposit hard and causing pinholes. A basic condition of the electrolyte causes disintegration.

According to the present invention, I correct this want of neutrality by removing the electrolyte from the plating cells, neutralizing the electrolyte, and then returning the neutral electrolye to the cell. For example, if the electrolyte is acid, I boil the solution in the presence of a basic precipitate of nickel, such as the carbonate or hydrate or both. This may be done by intermittent drawing off of the electrolyte and boiling the whole solution, but the process can advantageously be carried out in a continuous manner by drawing off the solution continually, boiling it and filtering it, and then returning it to the plating tank, at such a rate that the whole volume of solution in the tank is maintained substantially neutral. The rate of circulation may thus be such that the whole volume of solution is boiled every twelve to twenty-four hours, depending upon the current density, etc., and being faster the higher the density. If the solution is basic when coming from the plating tank, no basic nickel compound need be added, but the solution is treated for the removal of the precipitate before returning it to the plating tank. The solution coming from the tank may be preheated to near the boiling temperature by passing it into heat interchanging relation with the hot solution after boiling, thereby also cooling the hot solution to approximately the proper temperature before returning it to the plating tank, and economizing in the heat required for the boiling operation.

Even where no chemical reaction is produced by the boiling operation, this operation nevertheless seems to greatly benefit the deposit, probably due to the elimination of gases from the solution.

When the nickel deposit is produced as above described, with the observance of proper conditions of operation, a satisfactory malleable nickel deposit can be produced, and the process gives results which are commercially valuable, but with even the best conditions of operation it is difficult or impossible to avoid entirely the formation of gas bubbles and layers and the absorption of some hydrogen. I have found however that the deposited metal will weld simply by heating and rolling, hammering, pressing or drawing, and that the so treated metal is homogeneous and free from pits, from layers and from hydrogen. Accordingly, when a homogenous metal is desired, and when the deposit itself is not entirely homogeneous, due to gas bubbles and layers, the deposit can be made homogeneous by heating and working as above described. I may therefore produce cathodes of heavy dimensions and work these hot to the desired size and shape, and obtain products which are homogeneous in structure. I consider this combination of the electrolytic production of malleable nickel and the subsequent hot working of the deposit as particularly valuable and important, regardless of the particular procedure or process by which the electrolysis is carried out and the deposit produced. That is, I consider that the production of a malleable deposit by any method of electrodeposition, and subsequent hot working of the deposit, as my invention, independent of the improved electrolytic process itself, which I regard as a new process. Accordingly, I claim the improved method of electrodeposition, for the production of a satisfactory malleable deposit, as well as the combined method of malleable electrodeposition and subsequent hot working, regardless of the particular method of electrodeposition; as my invention.

While I have described the production of nickel it will be understood that I include as equivalents alloys thereof such as those containing cobalt and iron, etc., in varying proportions.

I claim:

1. The process of producing malleable nickel by electrodeposition, which comprises maintaining the electrolyte in condition by withdrawing it from the electrolytic tank, subjecting it to a boiling operation, and returning it for further use.

2. The process of producing malleable nickel by electrodeposition, which comprises maintaining the electrolyte in condition by withdrawing it from the electrolytic tank, subjecting it to a boiling operation in the presence of basic precipitate of nickel, and returning it for further use.

3. The process of producing malleable nickel by electrodeposition, which comprises carrying out the electrodeposition with anodes containing carbon, silicon or sulfur, and in keeping the electrolyte substantially neutral by withdrawing it from the electrolytic tank, subjecting it to a neutralizing operation, and returning it for further use.

4. In the process of claim 1, carrying out the electrodeposition with an electrolyte consisting partly at least of chloride of nickel.

5. The process of producing a homogeneous malleable nickel product, which comprises electro-depositing nickel while maintaining the electrolyte in condition by withdrawing it from the electrolytic tank, subjecting it to a boiling operation and returning it for further use, and subjecting the resulting electro-deposited nickel to a hot working operation for the production of a substantially homogeneous product.

In testimony whereof I affix my signature.

NOAK VICTOR HYBINETTE.